United States Patent [19]

Utner

[11] Patent Number: 4,853,825
[45] Date of Patent: Aug. 1, 1989

[54] CAPACITOR MOUNTED IN A PLASTIC CUP AND METHOD FOR MANUFACTURING SUCH DEVICE

[75] Inventor: Ferdinand Utner, Regensburg, Fed. Rep. of Germany

[73] Assignee: Siemens Aktiengesellschaft, Berlin and Munich, Fed. Rep. of Germany

[21] Appl. No.: 147,883

[22] Filed: Jan. 25, 1988

[30] Foreign Application Priority Data

Feb. 24, 1987 [DE] Fed. Rep. of Germany ....... 3705868

[51] Int. Cl.$^4$ .......................... H05K 1/04; H05K 5/06; H01G 9/00
[52] U.S. Cl. .................................... 361/306; 29/25.42; 174/52.2
[58] Field of Search ............. 361/306, 433; 174/52 S, 174/52 H, 52 R, 52 PE; 29/25.42; 24/5, 11 CT

[56] References Cited

U.S. PATENT DOCUMENTS

| | | | |
|---|---|---|---|
| 1,344,897 | 6/1920 | Johnson | 24/11 CT X |
| 2,624,968 | 1/1953 | Polizzi | 24/5 X |
| 2,674,646 | 4/1954 | Schoch | 361/433 X |
| 2,970,182 | 1/1961 | Miquelis | 174/52 PE |
| 3,250,969 | 5/1966 | Fanning | 29/25.42 X |
| 3,261,902 | 7/1966 | Pearce et al. | 361/433 X |
| 3,509,427 | 4/1970 | Ruscetta | 361/433 |
| 3,644,796 | 2/1972 | Carino | 361/433 |
| 3,806,766 | 4/1974 | Fanning | 361/433 X |
| 3,831,070 | 8/1974 | Bouille et al. | 174/52 PE X |
| 4,367,371 | 1/1983 | Nakamura | 174/52 R |
| 4,443,656 | 4/1984 | Linse | 174/52 PE |
| 4,448,265 | 5/1984 | Kodal et al. | 174/52 PE |

FOREIGN PATENT DOCUMENTS

| | | |
|---|---|---|
| 542431 | 11/1955 | Belgium ............... 361/433 |
| 0062167 | 3/1982 | European Pat. Off. . |
| 911606 | 2/1910 | Fed. Rep. of Germany . |
| 1926788 | 2/1910 | Fed. Rep. of Germany . |
| 6753341 | 8/1968 | Fed. Rep. of Germany . |
| 1299073 | 3/1970 | Fed. Rep. of Germany . |
| 7021001 | 6/1970 | Fed. Rep. of Germany . |
| 1514514 | 5/1971 | Fed. Rep. of Germany . |
| 3130837A1 | 2/1983 | Fed. Rep. of Germany . |
| 3216192A1 | 11/1983 | Fed. Rep. of Germany . |
| 3328787 | 2/1985 | Fed. Rep. of Germany . |
| 4550A/82 | 9/1982 | Italy . |
| 1071820 | 6/1967 | United Kingdom . |

Primary Examiner—Donald A. Griffin
Attorney, Agent, or Firm—Hill, Van Santen, Steadman & Simpson

[57] ABSTRACT

An electrical capacitor (1) which has at least substantially rectangular cross-section and is mounted in a plastic cup (2) and is potted with casting resin. Pairs of impressions (12, 13) are formed into the edges of the plastic cup (2), and the capacitor (1) is simultaneously centered and fixed. It is thereby assured that the capacitor retains its prescribed position during potting and, moreover, a uniformly thick resin layer is present between the capacitor (1) and the plastic cup (2).

10 Claims, 2 Drawing Sheets

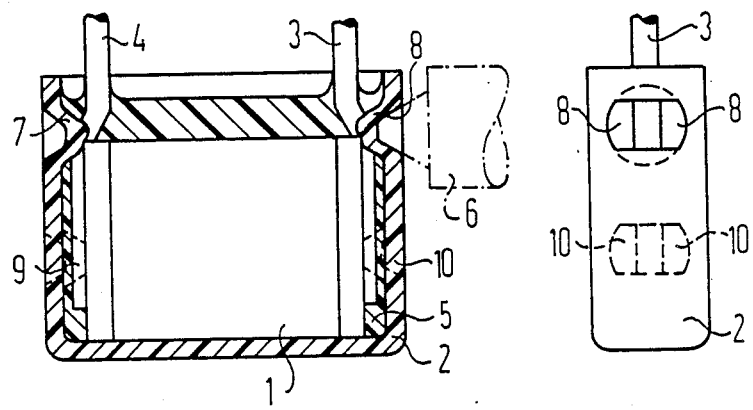
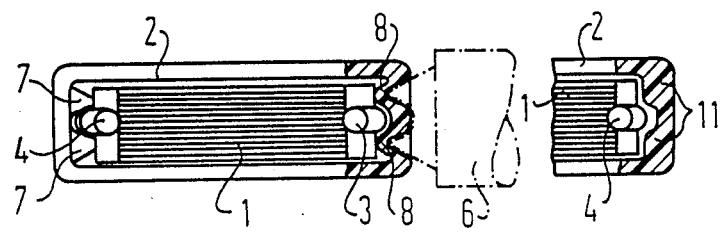

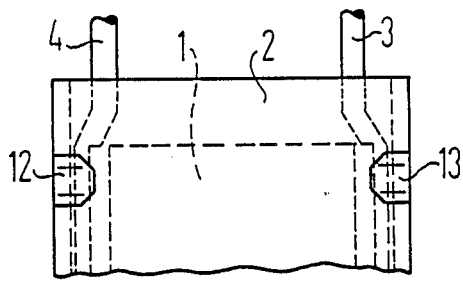
FIG 5
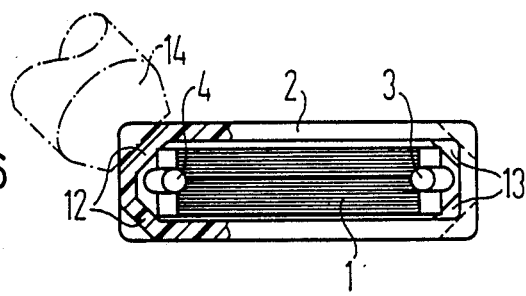
FIG 6
FIG 7
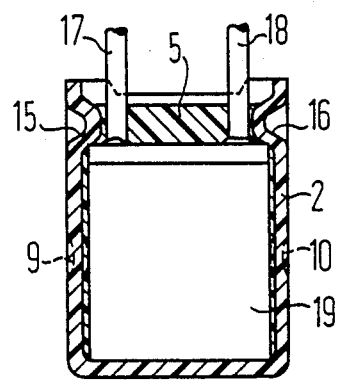
FIG 8
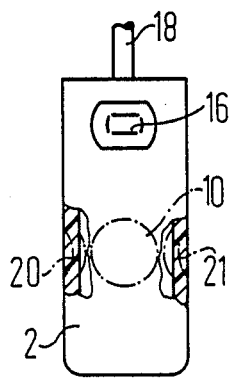

CAPACITOR MOUNTED IN A PLASTIC CUP AND METHOD FOR MANUFACTURING SUCH DEVICE

BACKGROUND OF THE INVENTION

1. Field of the Invention

This invention relates in general to an electrical capacitor which has a generally rectangular cross-section which is mounted so that it is centered in a housing which is in the form of a plastic cup having a rectangular cross-section and wherein said housing is provided with an opening through which power leads extend and the capacitor leads are attached to the plastic cup with a material which hardens.

The invention is also directed to methods for manufacturing such electrical capacitor in which the capacitor is inserted into a pre-fab plastic cup having a rectangular cross-section and the openings between the plastic cup and the capacitor are filled with a liquid hardenable casting material which subsequently hardens.

2. Description of the Prior Art

Capacitors mounted within a cup are known for example German Utility Model No. 6753341 discloses an electrolytic capacitor comprising foil windings mounted in a metal cup which has a round cross-section. The metal cup serves not only as protection for the foil winding, but also as one electrode of the capacitor. So as to attach the cup to the winding, the cup is provided with impressions at its internal surface and/or on its floor surface. These impressions are intended to prevent the cup from detaching from the winding during vibrations such as, for example, that occur in motor vehicles or during use of the apparatus in other environments and which could cause the connections of the one winding electrode to be detached from the cup due to vibration.

German Utility Model No. 19 26 788 discloses an electrical capacitor which has a cylindrical metal housing which has a beadlike projection approximately in the middle of the housing. The beadlike projection is intended to allow two small face spaces which are formed as a result of the projection to be filled with casting resin such that the one part is first filled with casting resin and after it is hardened, the second part of the housing is filled with casting resin. A corresponding capacitor is also disclosed in British Pat. No. 1,071,820.

German Pat. No. 1,299,073 discloses a method for integrating an electrical capacitor having end face contact surfaces in a cup-like housing. In the method disclosed, the electrical lead elements are first extended through the housing wall and are then connected to the face contact surfaces of the capacitor mounted outside of the housing and subsequently are inserted into the housing together with the capacitor. The disadvantage of this method is that the threading of the lead elements through the housing wall requires a considerable technical expense and is extremely susceptible to disruption of the method. Since the casting resin is very thin in the second casting, the holes provided for the lead elements in the housing wall must be dimensioned so that they are small since the casting resin would otherwise run out through such holes. For a fast threading of the leading elements through the holes, however, the holes should be formed as large as possible. The great possibility of disruptions in this method is a definite disadvantage.

German Utility Pat. No. 7,021,001 discloses a capacitor which has regularly attached leads in a prismatic shaped housing preferably composed of thermal plastic material. Upwardly projecting fork-shaped retaining clips are first injection molded to the housing and the retaining clips are bent by at least 90° into the interior of the housing after the insertion of the capacitor and the leads are fixed with the forks. The purpose of the forks is to assure the maintainance of a precise grid dimension, in other words, of a defined spacing of the lead wires from each other. Fixing of the capacitor to the housing thus occurs only indirectly by way of the wires of the capacitor whereas centering of the capacitor inside the housing does not occur at all. Thus, it is disadvantageous in that the tabs which are bent into the cup require an inadmissible great integration space which cannot be used for the winding. Also, the elasticity required for the bending restricts the material selection so that cost beneficial material such as plastic cannot be used.

German Utility Model No. 19 11 606 discloses a rectangular plastic cup for capacitor windings which have parallel leads that extend out through sealing compound so as to prevent moisture from entering the cup. On the inside of opposite walls of the cup there are flexible longitudinal ribs so as to assure that the winding in a cup is surrounded by an adequately thick layer of a casting resin on all sides so as to achieve adequate moisture protection. The disadvantage of these longitudinal ribs is that first they can only be realized with difficulty using injection molding technology, for example, due to the required ejection of the part and second only small tolerances between the component links and the inside links of the cup can be resiliently compensated. As a result of the elastic ribs, the same disadvantages as listed for German Utility Model No. 70 21 001 also occur.

U. S. Pat. No. 3,806,766 discloses an electrical component and method for manufacturing it wherein the components are introduced into a housing. The housing has recesses in which the leads of the electrical components are guided. As a consequence of the spring tension of the leads, the component is held until the casting resin solidifies which is supplied at a later time. Here again the fixing of the component occurs only indirectly by way of the leads whereas a direct fixing using lips or similar structures does not occur. However, a clamping by way of wires is only possible with an extremely small tolerance range of 0.1 mm and depending on the shape of the wire results in a loss of useable space.

European Pat. No. 0 062 167 discloses an electrical component which is mounted and centered in a housing. The electrical component is mounted in a cup which has a rectangular cross-section. The power leads of the component extend out of the opening of the cup in the same direction. The cup has at least two clips of the same material attached of one piece on opposite sides wherein the clips are bent over into the inside of the cup and hold the component in a clamped manner due to their resiliency and serve as centering and adjustment of the component during casting with casting material and hardening thereof. Although components contained in such cups have been placed on the market wherein about several millions of such parts have been utilized, it should be noted that the clips make the manufacturer of the cup more expensive and bending over the clips before the introduction of the capacitor increases the cost in that an additional manufacturing step is necessary and a large amount of the useable space is lost particularly wherein small grid dimensions such as, for example, type RM5 for the winding dimensions are available.

German published application No. 32 16 192 discloses an electrical component which can be mounted and centered and adjusted in a housing in the form of a cup which has a rectangular cross-section. The cup is provided with bulges on opposite sides which provide a clamping holding action of the component. This cup has the disadvantage in that so as to introduce a component such as a capacitor a spreader tool must be used which spreads the inwardly arced walls of the cup apart so that the component can be introduced.

Italian Pat. application 35 50A/82 which was published on 30th March 1984 discloses methods for anchoring capacitive elements. In this structure, a capacitive element is secured to a housing and liquid thermal plastic material at a temperature which is above its solidification point is introduced in a small amount such that it only partially fills the housing and the electrical component is then inserted into the housing and the capacitive element is secured to the housing when the material cools and due to the solidification of the potting material. This patent application also discloses that the capacitive element can be secured into the housing with clips which are attached to the housing which are bent over into the housing after the introduction of the capacitive element. The clips can be attached either to the narrow sides or to the broad sides of the housing.

This Italian patent application discloses that at least a subregion of the side walls should be plastically deformed toward the inside of the housing until they rest against the capacitive element. The deformation can be preceded by heating of the subregion which is to be deformed to a degree such that the subregion is plastically deformed. Such deformations can be symmetrically associated in pairs to power leads.

This Italian patent application also discloses that concave portions can be provided at the power leads and these concave portions extend beyond the end faces in the longitudinal direction or in the transverse direction with respect to the end faces of the capacitor and also by using additional recesses in the housing which provide latching of the concave portions of the power leads which result in firm seating of the capacitive element in the housing. There is a disadvantage due to this structure in that the tolerances are very small and the tolerances occuring between the cup, the winding, and the wire can be greater than the elasticity of the wire.

Each of the methods disclosed in the Italian Patent Application serves the purpose for fixing the capactive element precisely in a position in the cup in which it has been inserted into the cup. The centering thus also occurs indirectly in this structure in that the leads of the capacitive elements are fixed by exact guiding clamps. Bent wires thus result in an imprecise centering of the component. This error is preserved when subregions of the side walls of the housing are subsequently deformed until they press against the capacitive element.

SUMMARY OF THE INVENTION

It is an object of the present invention to provide a capacitor and method for manufacturing where the capacitor is simultaneously fixed and centered in a cup without using additional clips or guide ribs and wherein the inside cup dimensions independently of the winding tolerance can be fully utilized for the winding so that no structural space is lost due to the fastening means.

Advantageous embodiments of the invention are characterized in that the capacitor is centered and fixed by centering impressions formed in at least two side faces of the plastic cup.

An additional advantageous embodiment is that the capacitor is centered and fixed by centering impressions on at least two edges of the plastic cup.

Another advantageous embodiment of the capacitor is that the capacitor is centered and fixed by at least one centering impression in the plastic cup which encloses at least one power lead on at least one side.

An advantageous embodiment is provided in that the capacitor is at least partially laterally attached by only at least one centering impression which is provided in the proximity of the opening of the plastic cup.

Another form of the capacitor of the invention is that the capacitor is centered and fixed by increasing the material thickness of the plastic cup in the region of impressions. Without tearing the cup walls, this assures that even small windings such as windings lying at the lower end of the tolerance spectrum can be gripped by deep impressions.

A method of the invention provides for manufacturing the capacitor of the invention wherein after the insertion of the capacitor in the plastic cup centering impressions are first produced in at least two lateral faces or in at least two edges of the plastic cup and the capacitor is centered and fixed by these impressions and then the additional method step occurs of filling the cup with casting material which subsequently hardens.

Another method of the invention for manufacturing an electrical capacitor is characterized in that the centering impressions are first produced in the prefabricated plastic cup in at least two lateral faces or in at least two edges of the plastic cup and the capacitor is inserted into the plastic cup and is centered and fixed by the centering impressions which are then already present and subsequently the method steps of filling with casting material and hardening thereof occur.

Another method for manufacturing capacitor is characterized in that the impressions fixing and centering the capacitor in the plastic cup are produced with indentation die which operate in a clocked fashion.

Another advantageous method for manufacturing electrical capacitor is characterized in that impressions fixing and centering the capacitor in the plastic cup are produced with continuously running and indenting wheels.

Among the advantages provided by the invention is that the capacitor is centrally centered in the housing and is simultaneously fixed without any additional guide lips or clips at the cup housing and, thus, cannot change in position during the casting and this also assures that the casting resin fills between the capacitor and cup walls uniformly and with no loss of structural space for the winding occurs.

Other objects, features and advantages of the invention will be apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIG. 1 is a cross-section through a finished capacitor according to the invention;

FIG. 2 is an elevation of the narrow side of the capacitor of the invention;

FIG. 3 is a view of the capacitor viewed through the cup opening;

FIG. 4 is a detail of the reinforcement of the cup wall;

FIG. 5 illustrates a capacitor mounted in an edge impressed cup;

FIG. 6 illustrates the capacitor of FIG. 5 from the side of the cup opening;

FIG. 7 illustrates another embodiment of a capacitor mounted in a cup; and

FIG. 8 is an elevational view of the narrow side of the capacitor of FIG. 7.

DESCRIPTION OF THE PREFERRED EMBODIMENTS

FIG. 1 illustrates a capacitor 1 mounted in a plastic cup 2. The capacitor 1 is fixed and centered due to lateral impressions 7 and 8 which are formed on opposite sides of the plastic cup 2. The lateral impression 8 is formed with an indenting die 6 and the lateral impression 7 is formed with an indenting die similar to the die 6.

The lateral impression 7 and 8 are arranged symmetrically relative to the leads 3 and 4 on opposite sides of the cup 2. If desired a stronger attachment of the capacitor 1 to the plastic cup 2 can be accomplished using additional impressions 9 and 10 which are formed at a lower portion in the cup 2 as shown in FIGS. 1 and 2. This can be particularly desirable when as shown in FIG. 1 the lateral impression 7 and 8 are formed largely above the upper edge of the capacitor so as to prevent the capacitor 1 from sliding out of the plastic cup 2. The cup and the capacitor 1 are then potted with casting material 5 which is poured into the cup 2 so as to completely enclose the capacitor 1 and the indentations 7 and 8, 9 and 10 prevent the capacitor from floating up so as to destroy the original centering. When indenting at the small lateral surfaces of the cup 1 it is advantageous that the indentations strike the rough edge surfaces of the winding 1 and therefore assure good anchoring of the capacitor in the cup.

FIG. 2 is a sideview of the capacitor 1 as seen from the narrow side of the cup 2. It is to be observed that the lateral impression 8 has two portions that extend inwardly and the two portions are symmetrically around the power lead 3. The additional possible impressions 9 and 10 are indicated by broken lines.

FIG. 3 shows the capacitor 1 viewed toward the open side of the plastic cup 2. The symmetrical alignment of the capacitor and the plastic cup 2 is assured by the centering shape of the indentation die 6. The parabolic recess at the front end of the indenting die 6 assures that the power lead 3 is aligned exactly in a central manner relative to the cup 2. So as to prevent the capacitor from moving toward the right or left, it is necessary that the lateral impression 7 is formed simultaneously with the formation of the lateral impression wherein the indenting die for the lateral impression 7 must be shaped exactly the same as the indenting die 6. This shape of the indenting die is also suitable for producing the additional impressions 9 and 10 which form the indentations in FIG. 1.

Depending on the material of the plastic cup which is used, a reinforcement 11 of the cup 12 as shown in FIG. 4, can provide an improved holding means for the capacitor 1 and the plastic cup 2. Deep indentations as required for small windings (winding tolerances) can also be produced without a tearing of the cup occurring in the region of the indentations. The reinforcement 11 of the cup wall however, must be accomplished such that the centering caused by the indentation die is not destroyed. The reinforcement of the cup wall particularly serves the purpose of assuring that the strength and retention of the shape of the cup during the indentention process occurs.

When it is not assured that the power leads 3 and 4 of the capacitor lie exactly in the middle of the narrow sides of the capacitor, it is recommended to form an edge impression 12 and 13 as shown in FIG. 5. Additional impressions can also be utilized and formed into the sides of the cup 2 without effecting the results.

FIG. 6 is a view of the open side of the cup 2 of the capacitor 1 shown in FIG. 5. Due to the edge impressions 12 and 13, a simultaneous centering and fixing of the capacitor 1 is achieved in the plastic cup independently of the position of the power leads 3 and 4. The simultaneous centering and fixing of the capacitor 1 can be achieved either with 4 indenting dies 14 of which only one is shown, however, the use of two indenting dies as shown in FIG. 3 so as to form a larger parabolic recess may also be utilized. However, centering always results whenever the paired edge impressions 13 and 12 are simultaneously formed. Of course, a combination of an impression 7 with an impression 13 is also possible. The introduction of the capacitor in the cup with subsequent centering and fixing using impressions is especially advantageous when different dimensions of the capacitor occur. When, by contrast, the dimensions of the capacitors are nearly identical then it can be advantageous to first provide the cup with impressions wherein a die is introduced into the cup during the deformation process and the width and depth of the impressions are slightly smaller than the corresponding dimensions of the smallest possible capacitor and the capacitor is then introduced into the cup.

FIG. 7 illustrates a cup 2 which has additional impressions 9 and 10. The capacitor 19 has power leads 17 and 18 which are located at the same edge surface as the capacitor 19 shown, for example, in German published application No. 33 42 329. The impressions 15 and 16 prevent the capacitor 19 from floating up when potting occurs with the potting compound 5. Since the impressions 15 and 16 partially project over the capacitor a reliable seat of the capacitor 19 in the plastic cup 2 is assured.

FIG. 8 provides a view of the narrow side of the capacitor shown in FIG. 7. The impression 16 has again been formed in the plastic cup 2 and the impression 16 is symmetrical relative to the lead 18, but differs from that shown in FIG. 2 in that does not surround it. The additional impressions 10, 20 and 21 serve to center the capacitor in the plastic cup 2. These impressions or indentations are shown with broken lines since both the shape as well as the position of every impression is to be selected according to the conditions and the shape of the edge impression as is most advantageous. Heated or unheated dies as well as ultrasound excited dies can also be used for producing the impressions. Also, the region to be deformed can be heated with hot air nozzles and the regions can then be indented with indenting dyes or indenting wheels.

Although the invention has been described with respect to preferred embodiments, it is not to be so limited as changes and modifications can be made which are within the full intended scope of the invention as defined by the appended claims.

I claim as my invention:

1. A composite electrical capacitor which has a substantially rectangular cross-section and is centered when mounted in a housing which has the shape of a plastic cup (2) with a rectangular cross-section and which is formed with an opening for power leads (3, 4) which project out of said opening of the plastic cup (2) in the same direction, and are fixed to the plastic cup (2) with hardening material, characterized in that the capacitor (1) is centered and held and potted with casting material (5) which hardens, and said capacitor is centered in said cup and is fixed by centering impressions (12, 13) formed in the plastic cup (2), characterized in that said capacitor (1) is centered and fixed by centering impressions (7, 8) formed in at least two lateral surfaces of said plastic cup (2), and characterized in that the capacitor (1) is centered and fixed by at least one centering impression (8) formed in the plastic cup (2) in at least one side and which encloses at least one power lead.

2. A composite electrical capacitor according to claim 1 characterized in that said capacitor (1) is centered and fixed by increasing the thickness of the material of said plastic cup (2) in the region of the impressions (7, 8, 12, 13).

3. A method for manufacturing an electrical capacitor comprising, inserting a capacitor (1) into a prefabricated plastic cup (2) which has a rectangular cross-section, forming after the insertion of said capacitor into the plastic cup (2) centering impressions (9, 10, 20, 21 or 12, 13) in at least two lateral surfaces or at least two edges of the plastic cup (2) such that the capacitor is centered and fixed by said impressions, and filling the cavities between said plastic cup (2) and said capacitor (1) with liquid, hardenable potting material which subsequently hardens.

4. The method for the manufacture of a capacitor according to claim 3 comprising, forming said impressions (9, 10, 20, 21 or 12, 13) for fixing and centering the capacitor (1) in the plastic cup (2) with indentation dies which operate in timed fashion.

5. A method for manufacturing a capacitor according to claim 3 comprising forming said impressions (9, 10, 20, 21 or 12, 13) for fixing and centering the capacitor (1) in the plastic cup (2) with continuously running indentation wheels.

6. A composite electrical capacitor which has a substantially rectangular cross-section and is centered when mounted in a housing which has the shape of a plastic cup (2) with a rectangular cross-section and which is formed with an opening for power leads (3, 4) which project out of said opening of the plastic cup (2) in the same direction, and are fixed to the plastic cup (2) with hardening material, characterized in that the capacitor (1) is centered and held and potted with casting material (5) which hardens, and said capacitor is centered in said cup and is fixed by centering impressions (12, 13) formed in the plastic cup (2), and characterized in that said capacitor (1) is centered and fixed by increasing the thickness of the material of said plastic cup (2) in the region of the impressions (7, 8, 12, 13).

7. A composite electrical capacitor which has a substantially rectangular cross-section and is centered when mounted in a housing which has the shape of a plastic cup (2) with a rectangular cross-section and which is formed with an opening for power leads (3, 4) which project out of said opening of the plastic cup (2) with hardening material, characterized in that the capacitor (1) is centered and held and potted with casting material (5) which hardens, and said capacitor is centered in said cup and is fixed by centering impressions (12, 13) formed in the plastic cup (2), characterized in that said capacitor (1) is centered and fixed by centering impressions (7, 8) formed in at least two lateral surfaces of said plastic cup (2), and characterized in that said capacitor (1) is centered and fixed by increasing the thickness of the material of said plastic cup (2) in the region of the impressions (7, 8, 12, 13).

8. A composite electrical capacitor which has a substantially rectangular cross-section and is centered when mounted in a housing which has the shape of a plastic cup (2) with a rectangular cross-section and which is formed with an opening for power leads (3, 4) which project out of said opening of the plastic cup (2) in the same direction, and are fixed to the plastic cup (2) with hardening material, characterized in that the capacitor (1) is centered and held and potted with casting material (5) which hardens, and said capacitor is centered in said cup and is fixed by centering impressions (12, 13) formed in the plastic cup (2), characterized in that the capacitor (1) is centered and fixed by centering impressions (12, 13) formed in at least two edges of the plastic cup (2), and characterized in that said capacitor (1) is centered and fixed by increasing the thickness of the material of said plastic cup (2) in the region of the impressions (7, 8, 12, 13).

9. A method for manufacturing an electrical capacitor comprising, inserting a capacitor (1) into a prefabricated plastic cup (2) which has a rectangular cross-section, forming centering impressions (9, 10, 20, 21 or 12, 13) in the plastic cup (2) in at least two lateral surfaces or at least two edges of the plastic cup (2), inserting the capacitor (1) into the plastic cup (2) and centering with the centering impressions (9, 10, 20, 21 or 12, 13), and filling the cavities between said plastic cup (2) and capacitor with liquid, hardenable potting material (5) which subsequently hardens, and comprising, forming said impressions (9, 10, 20, 21 or 12, 13) for fixing and centering the capacitor (1) in the plastic cup (2) with indentation dies which operate in timed fashion.

10. A method for manufacturing an electrical capacitor comprising, inserting a capacitor (1) into a prefabricated plastic cup (2) which has a rectangular cross-section, forming centering impressions (9, 10, 20, 21 or 12, 13) in the plastic cup (2) in at least two lateral surfaces or at least two edges of the plastic cup (2), inserting the capacitor (I) into the plastic cup (2) and centering with the centering impressions (9, 10, 20, 21 or 12, 13), and filling the cavities between said plastic cup (2) and capacitor with liquid, hardenable potting material (5) which subsequently hardens, and comprising, forming said impressions (9, 10, 20, 21 or 12, 13) for fixing and centering the capacitor (1) in the plastic cup (2) with continuously running indentation wheels.

* * * * *